(No Model.) 3 Sheets—Sheet 1.
T. KEENE.
PACKING FOR PISTON RODS.
No. 530,426. Patented Dec. 4, 1894.
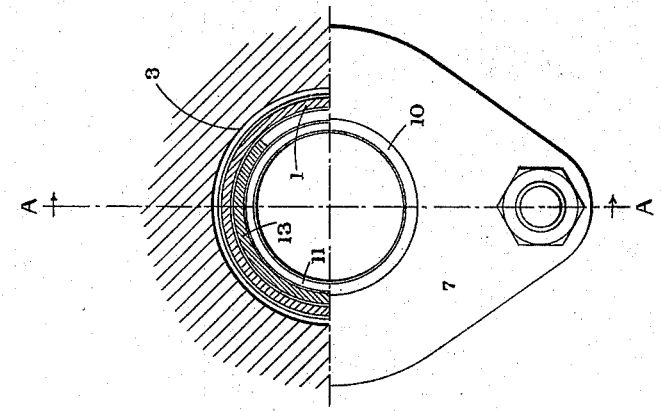
Fig. II
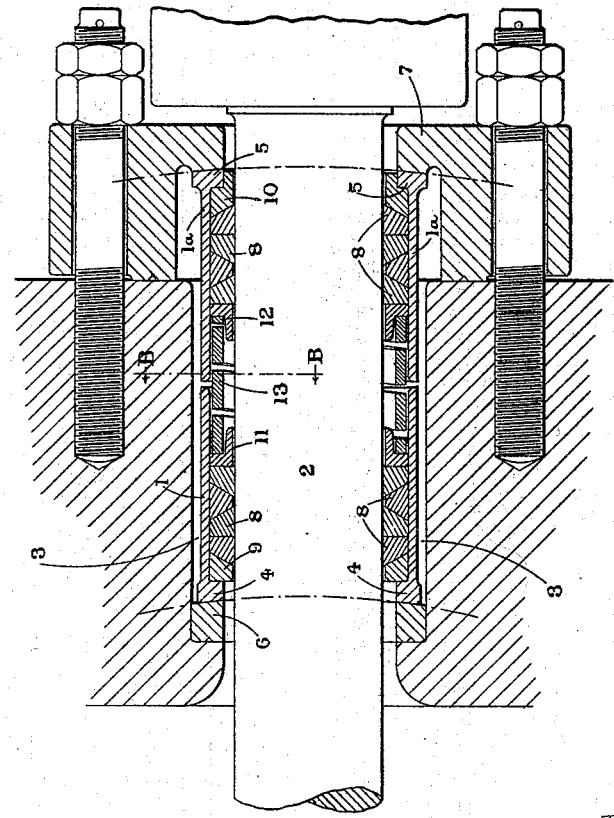
Fig. I
Attest
Walter Donaldson
F. L. Middleton
Inventor
Trevor Keene
by Ellis Spear
Atty.

(No Model.) 3 Sheets—Sheet 2.
T. KEENE.
PACKING FOR PISTON RODS.
No. 530,426. Patented Dec. 4, 1894.
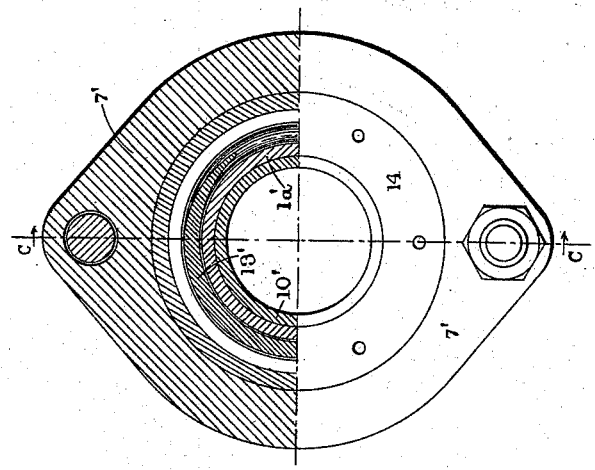
Fig. IV
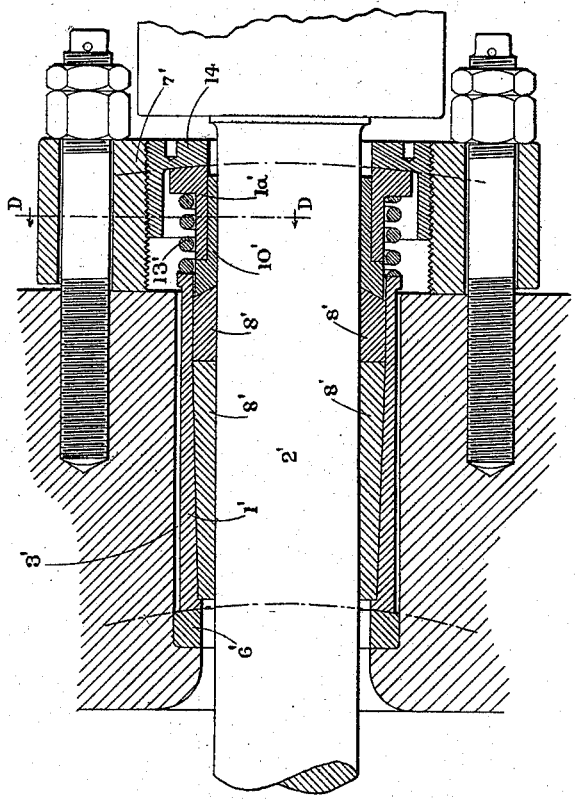
Fig. III
Attest
Walter Donaldson
F. L. Middleton
Inventor
Trevor Keene
by Ellis Spear
Atty.

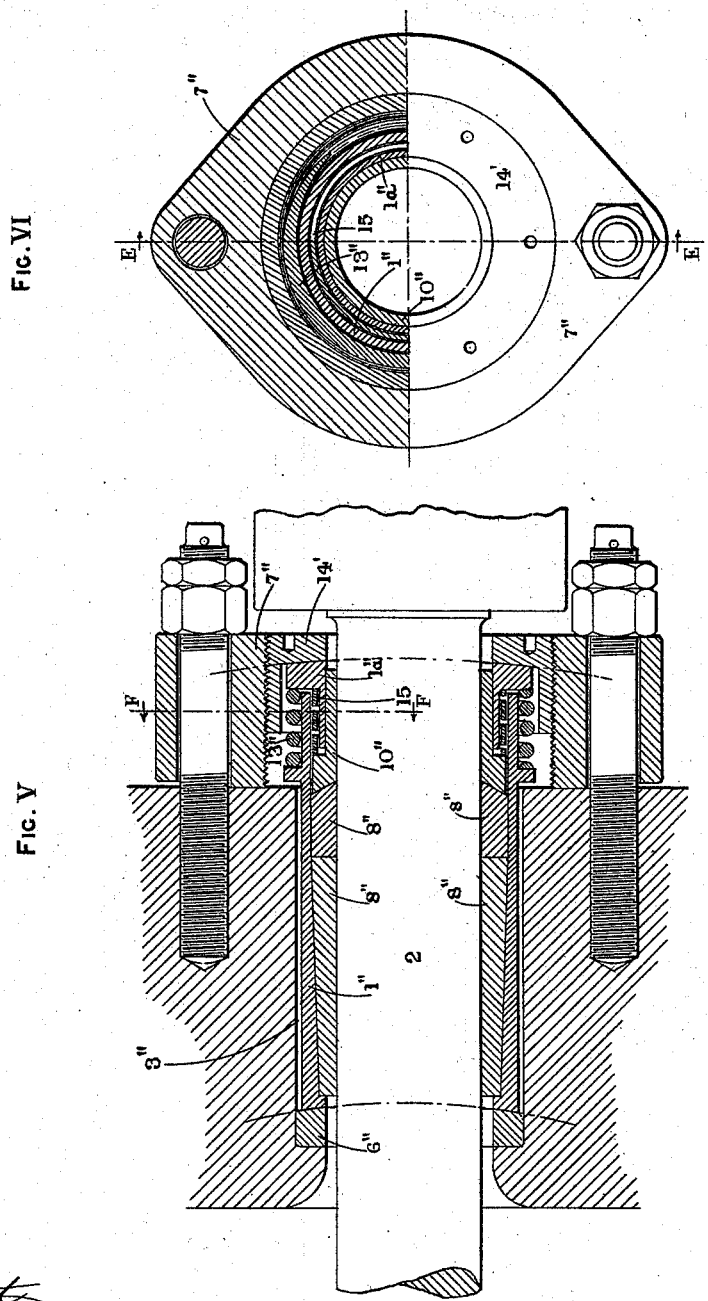

UNITED STATES PATENT OFFICE.

TREVOR KEENE, OF BIRKENHEAD, ENGLAND.

PACKING FOR PISTON-RODS.

SPECIFICATION forming part of Letters Patent No. 530,426, dated December 4, 1894.

Application filed March 17, 1894. Serial No. 504,072. (No model.) Patented in England November 29, 1892, No. 21,768.

*To all whom it may concern:*

Be it known that I, TREVOR KEENE, a subject of the Queen of Great Britain, residing in Birkenhead, in the county of Chester, England, have invented certain new and useful Improvements in Packing for Piston-Rods, (for which, in part, I have obtained a patent in Great Britain, No. 21,768, bearing date November 29, 1892,) of which the following is a specification.

This invention relates to metallic packing for piston rods and the like, and the object is to provide a cheap and effective packing which, while permitting a transverse vibration of the rod due to want of alignment between the crosshead guides and the cylinder, will tend to support the weight of the piston and rod, so as to prevent undue wear of the cylinder.

In the accompanying drawings which illustrate my invention:—Figure I is a sectional elevation on the line A. A. of Fig. II. Fig. II is an end elevation, the upper half being in section on the line B. B. of Fig. I. Figs. III, IV, V, and VI, are analogous views of modifications, the sections being, respectively, on the lines C. C. and D. D. and E. E. and F. F.

Throughout the drawings similar parts are indicated by the same reference figures, and in the case of sections, the direction in which they are viewed, is indicated by the small arrows placed adjacent to the letters denoting the plane of section.

The packing proper is carried in a main sleeve 1, 1ª having a larger internal diameter than the diameter of the rod 2 to be packed, and a smaller external diameter than the stuffing box 3 in which it is located. The opposite ends of the sleeve are provided with projecting flanges 4 and 5, the outer end surfaces of which are spherical and are struck, as shown by the dotted lines, from the same center and are therefore concentric. The spherical surface on the inner end of the sleeve bears upon a corresponding convex spherical surface formed on the face of a washer 6 fitting in the bottom of the stuffing box and the spherical surface on the outer end bears on a corresponding concave spherical surface formed on the gland 7 carried by the usual gland studs or it may be formed on an inner gland adjustable relatively to the outer gland. The main sleeve is divided transversely at or about the middle of its length into two parts 1 and 1ª, and in each part I provide a series of white metal rings 8 which occupy the space between the rod and the sleeve for a portion of the length of the latter. The rings of white metal are cut so that they can be closed upon the rod and are kept in position by two brass or gun-metal neck rings 9 and 10 interposed between the two extreme rings and the internal flanges 4 and 5 on the main sleeve, and by two brass or gun-metal rings 11 and 12 of "L" section, separated by a compressed spiral spring 13, which is interposed between the adjacent central white-metal rings.

The white-metal rings and the brass or gun-metal rings have their adjacent surfaces suitably beveled as shown so that the pressure due to the compressed spiral spring 13 tends to force certain of the white-metal rings into close contact with the rod, and it will also be seen that since the pressure of the said spring is transmitted through the white-metal rings to the flanges 4 and 5 of the main sleeve the spring tends to produce a uniform pressure between the concentric spherical surfaces of the latter and their seatings.

When the piston rod to be packed has swelled ends, the rings fitting on the rod, have, of course, to be split longitudinally but I make the internal flanges 4 and 5 of the main sleeve sufficiently large to pass over the swelled portion. The interposed spring 13 in such cases may also be so constructed as to admit of longitudinal division into two or more parts.

The use of the main unsplit sleeve 1, 1ª, sufficiently large to pass over the swelled portion of the rod, in conjunction with a series of split rings fitting the rod and held together by the sleeve, constitutes an important feature of my invention, as the arrangements hitherto in use for holding split rings upon the rod give considerable trouble when the packing has to be removed.

In the modification shown in Figs. III and IV the main sleeve 1′, 1ª′, is provided, as before, with end surfaces of concentric spherical configuration, the inner one of which bears on the corresponding surface of the washer 6'. The outer surface, however, bears on an inner gland 14 adjustable relatively to the outer gland 7'. In this modification there are only two white-metal rings 8' and the outer gun metal ring 10' has a much longer bearing in the sleeve 1ᵃ' and on the rod. The interposed spring 13' as before produces a uniform pressure on the spherical seatings, which pressure may be adjusted by means of the adjustable inner gland 14.

In Figs. V and VI a second spring 15 is interposed between the outer part 1ᵃ'' of the main sleeve and the outer gun metal ring 10'' in order to prevent undue nipping pressure on the white metal rings as a result of the careless adjustment of the inner gland 14'.

The concentric spherical bearing surfaces are struck from a center corresponding with about the mean position of the piston so that while the packing can move laterally in the stuffing box to accommodate the rod, it can only do so by radiating about this center, and in this way the packing tends to support the weight of the piston and rod.

I find the constant definite pressure between the spherical bearing surfaces of advantage in the following way:—When the steam from the cylinder leaks to a small extent past the inner spherical surface it is trapped in the annular space in the stuffing box, and being wire drawn its pressure is insufficient to enable it to pass the outer spherical surface. When however its pressure rises by continued leakage, it assists the interposed spring in producing a pressure between the spherical surfaces and so tends to prevent further leakage. The action in this respect somewhat resembles that of a steam trap or reducing valve and as a result the compression of the interposed spring may be less than that necessary to so press together the spherical bearing surfaces as to entirely prevent any escape of steam between the said inner surfaces when the engine is starting, at which time the tendency to escape is greatest, this tendency being less when the engine is running owing to the rapid alternation of the admission and exhaust of steam. I find this feature of especial advantage in locomotive packings. A drain cock may be fitted to allow of the escape of any water resulting from the condensation of steam in the stuffing box.

Having now fully described my invention, what I claim, and desire to secure by Letters Patent, is—

1. A piston rod packing, comprising a sleeve having a spherical bearing at each end struck from the same point approximately coincident with the mean position of the piston and packing rings within the sleeve, the convex surface of said bearings facing outwardly from the cylinder, substantially as described.

2. In metallic rod packing, in combination, a sleeve divided transversely into two parts and having concentric spherical end bearing surfaces struck from a point approximately coincident with the mean position of the piston, flanges upon said parts, split neck rings bearing against said flanges and packing rings confined by said split neck rings, substantially as described.

3. In metallic rod packing, in combination, a sleeve divided transversely into two parts and having concentric spherical end bearing surfaces struck from a point approximately coincident with the mean position of the piston, internal flanges on the outer portions of the said parts, split neck rings bearing against the said flanges, packing rings confined by the said neck rings, and an interposed spring pressing the two parts of the sleeve asunder and against the end bearing surfaces; substantially as described.

4. In metallic rod packings, in combination, a sleeve divided transversely into two parts and having concentric spherical end bearing surfaces struck from a point approximately coincident with the mean position of the piston, internal flanges on the outer portions of the said parts, split neck rings bearing against the said flanges, two groups of packing rings confined by the said neck rings, and a spring interposed between the two groups of packing rings and adapted to transmit pressure, through the packing rings, to press the two parts of the sleeve asunder and against the end bearing surfaces; substantially as described.

5. In metallic rod packing in combination, a sleeve having concentric spherical end bearing surfaces and divided transversely into two parts, each part having at the end an internal flange adapted to engage with and hold the split neck rings but to pass over the swelled part of rod, and split neck rings and packing rings held within the said sleeve and an interposed spring pressing the two parts of the said sleeve asunder, substantially as described.

In testimony whereof I have hereunto set my hand in the presence of two subscribing witnesses.

TREVOR KEENE.

Witnesses:
J. E. LLOYD BARNES,
*Patent Agent, 26 Castle St., Liverpool.*
JOHN N. DOWNWARD,
*Clerk to the above.*